US007349854B2

(12) United States Patent
Frederick

(10) Patent No.: US 7,349,854 B2
(45) Date of Patent: Mar. 25, 2008

(54) METHOD, APPARATUS AND MEDIUM FOR OBTAINING SHIPPING INFORMATION

(75) Inventor: Kenneth A. Frederick, Pleasanton, CA (US)

(73) Assignee: United Parcel Service of America, Inc., Atlanta, GA (US)

( * ) Notice: Subject to any disclaimer, the term of this patent is extended or adjusted under 35 U.S.C. 154(b) by 635 days.

(21) Appl. No.: 10/142,749

(22) Filed: May 8, 2002

(65) Prior Publication Data

US 2003/0004830 A1 Jan. 2, 2003

Related U.S. Application Data

(60) Provisional application No. 60/289,688, filed on May 8, 2001.

(51) Int. Cl.
*G06Q 99/00* (2006.01)

(52) U.S. Cl. ........................................................ 705/1

(58) Field of Classification Search ................ 705/1, 705/25–28, 56
See application file for complete search history.

(56) References Cited

U.S. PATENT DOCUMENTS

| 6,047,264 | A  | * | 4/2000  | Fisher et al. ................. 705/26 |
| 6,094,642 | A  | * | 7/2000  | Stephenson et al. .......... 705/28 |
| 6,220,509 | B1 | * | 4/2001  | Byford ....................... 235/375 |
| 6,463,420 | B1 | * | 10/2002 | Guidice et al. ............... 705/28 |
| 6,948,134 | B2 | * | 9/2005  | Gauthier et al. ............ 715/804 |
| 2002/0032612 | A1 | * | 3/2002 | Williams et al. .............. 705/26 |
| 2002/0052794 | A1 | * | 5/2002 | Bhadra ........................ 705/22 |
| 2002/0083093 | A1 | * | 6/2002 | Goodisman et al. ........ 707/511 |

FOREIGN PATENT DOCUMENTS

JP  2000268101 A  9/2000

(Continued)

OTHER PUBLICATIONS

PR Newswire, "TanData Uses XML Technology To Enhance Shipping Software Solution," New York, Apr. 6, 2001, p. 1.*

(Continued)

*Primary Examiner*—Yogesh C. Garg
*Assistant Examiner*—Amee A. Shah
(74) *Attorney, Agent, or Firm*—Alston & Bird LLP

(57) ABSTRACT

The present invention enables users to access shipping information pertaining to the shipment of parcels by merely selecting an action from a tool bar or menu associated with a text string in a document or spreadsheet either recognized by a Microsoft Office smart tag or highlighted by user. The actions from which to select include but are not limited to tracking, time in transit, shipping history, label generation, address validation, proof of delivery and rate and service selection. The present invention automatically cuts the necessary text from the document or spreadsheet in which the user is working, opens or accesses databases, files, applications, websites, etc., as required to obtain the desired shipping information from a database accessible by the user, such as over a LAN or Internet connection. The present invention processes the data retrieved (including cutting, pasting, inserting or manipulating data and initiating actions such as dialing a phone number, generating a label or sending an e-mail) and preferably presents the results to the user in a message box or as an insert into the document or spreadsheet in which the user is working.

19 Claims, 7 Drawing Sheets

FOREIGN PATENT DOCUMENTS

WO      WO97/08628      3/1997

OTHER PUBLICATIONS

Gilbert, A., *Rule No. 1: Don't Annoy Your Customers—Online Retailers Are Learning To Use Improved Logistics To Keep Customers Happy*, Information Week, Dec. 13, 1999, pp. 134, retrieved from DIALOG, No. 06873349.

Janah et al., *Special Delivery*, Information Week, Oct. 27, 1997, No. 654, pp. 42 (8 pages), retrieved from DIALOG, No. 09861680.

International Search Report, Apr. 29, 2003.

Japanese Search Report for Japanese Patent Application No. 2002-588324, completed Dec. 1, 2006, mailed Dec. 5, 2006.

Japanese Non-Patent Literature cited in Japanese Search Report for Japanese Patent Application No. 2002-588324 dated Dec. 1, 2006.

\* cited by examiner

| | A | B | C | D | E | F | G |
|---|---|---|---|---|---|---|---|
| 1 | ABC COMPANY | | | | | | |
| 2 | | | | | | | |
| 3 | 123 Anywhere street | | | | Phone: 123.456.7890 | | |
| 4 | SUITE #100 | | | | Fax: 123.456.7890 | | |
| 5 | Anywhere, CA 12345 | | | | E-Mail: someone@anywhere.com | | |
| 6 | USA | | | | | | |
| 7 | | | | | | | |
| 8 | Statement | | | | | | |
| 9 | | | | | | | |
| 10 | | Statement #: | 123456 | | Bill To: | | |
| 11 | | Date: | 2/1/01 | | Satisfied Customer | | |
| 12 | | Customer ID: | 1234 | | 987 Main Street | | |
| 13 | | UPS Tracking #: | 1z950x9703 ⊕ ▽6543 | 42 | Suite #1 | | |
| 14 | | | | Smart Tag Actions | Businessville, CA 98765 | | |
| 15 | | | | | USA | | |
| 16 | | | | | | | |
| 17 | Date | Type | Invoice # | Description | Amount | Payment | Balance |
| 18 | 2/1/01 | Replen | 12345678 | Pens | $ 20.00 | $ - | $ 20.00 |
| 19 | | | | | | | |
| 20 | | | | | | | |

METHOD, APPARATUS AND MEDIUM FOR OBTAINING SHIPPING INFORMATION

CROSS-REFERENCE TO RELATED APPLICATIONS

The present application claims benefit of U.S. Provisional Application No. 60/289,688, filed May 8, 2001, and titled "*Carrier and Package Delivery Smart Tags*," the disclosure of which is incorporated herein by reference.

BACKGROUND OF THE INVENTION

I. Field of the Invention

The present invention relates to desktop tools for the provisioning and management of package delivery.

II. Description of Related Art

The management of parcel shipping data within a company, regardless of the size of the company, is an important function. By efficiently managing and using parcel shipping data, the company can save significant transaction and overhead costs. To that end, carriers have developed and deployed numerous software tools that enable their customers to access shipping data more efficiently than ever before. For example, United Parcel Service of America, Inc. ("UPS") has launched a web-based service called MY UPS.COM™ to provide customers with internet shipping services, enhanced tracking services, supply order services, etc., through an automated system that provides requested information in real time.

While such tools are an improvement over prior art systems and methods, these tools still require the user to perform numerous steps to obtain certain shipping information. For example, a user working on a spreadsheet document or word processor document may identify within that document a tracking number associated with a certain parcel for which the user wishes to obtain shipping information such as the status of the parcel's delivery. In order to obtain this information, the user typically has to open their internet browser application, go to a particular web site provided by the carrier, possibly log into the web site and then either type or copy/paste the tracking number into the appropriate web page. The web site then processes the tracking number and then presents the requested shipping information to the user via a web page interface. If the user then wishes to place some or all of the shipping information into the spreadsheet or word processor document, then the user must copy that information from the internet browser application and paste it into the document in which they are working, often creating formatting problems in the document.

Accordingly, there is a yet unsatisfied need in the industry for further reducing the steps required by a user to obtain and process shipping data.

BRIEF SUMMARY OF THE INVENTION

The present invention enables users to access shipping information pertaining to the shipment of parcels by merely selecting an action from a tool bar or menu associated with a text string in a document or spreadsheet either recognized by a MICROSOFT OFFICE® smart tag or highlighted by user. The actions from which to select include but are not limited to tracking, time in transit, shipping history, label generation, address validation, proof of delivery and rate and service selection. The present invention automatically cuts the necessary text from the document or spreadsheet in which the user is working, opens or accesses databases, files, applications, websites, etc., as required to obtain the desired shipping information from a database accessible by the user, such as over a LAN or Internet connection. The present invention processes the data retrieved (including cutting, pasting, inserting or manipulating data and initiating actions such as dialing a phone number, generating a label or sending an e-mail) and preferably presents the results to the user in a message box or as an insert into the document or spreadsheet in which the user is working.

In accordance with an embodiment of the present invention, a system for obtaining shipping information associated with a parcel comprises a server including a database having shipping information associated with a parcel, wherein the information is accessible by users, and a software application operable on a computer that is remote to the server and in communication with the server, wherein the software application recognizes predefined text strings or a user selects a text string for which one or more predefined actions can be invoked, including accessing at least certain of the shipping information at the sever associated with a recognized text string. When an action is selected, it causes the software application to send user identification information to the server in a request for data associated with the parcel, wherein the parcel is associated with the recognized text string. The request is for shipping data, which can include, but is not limited to tracking information, time in transit information, address validation information, shipping label generation data, or rate information. The data is processed by the computer according to the selected action, and is pasted into a document opened on a desktop of the computer, displayed in a message window on a desktop of the computer, and/or stored.

In accordance with another embodiment of the present invention, a computer program product for obtaining shipping information from a remote source comprises a computer usable medium having computer readable program code that recognizes a predefined text string in a document or file being operated on by the software application and for which one or more predefined actions can be invoked, computer readable program code that generates a request for shipping information associated with an text string from a remote source in accordance with a selected action, and computer readable program code that processes the shipping information by the second software application in accordance with the selected action.

In accordance with yet another embodiment of the present invention, a method for obtaining shipping information comprises providing a software add-in module configured for installation in connection with a software application, wherein the add-in module is configured to recognize a predefined text string in a document or file being operated on by the software application and for which one or more predefined actions can be invoked, and generate a request for the shipping information associated with an text string at a remote sever in accordance with a selected action. The method further comprises receiving a request from the add-in module or the software application for shipping information associated with a text string recognized by the software application, and sending the requested shipping data to the software application in response to the request.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 3-7 are illustrative user interfaces showing examples of an implementation in accordance of the present invention.

DETAILED DESCRIPTION OF THE INVENTION

Figure 1:
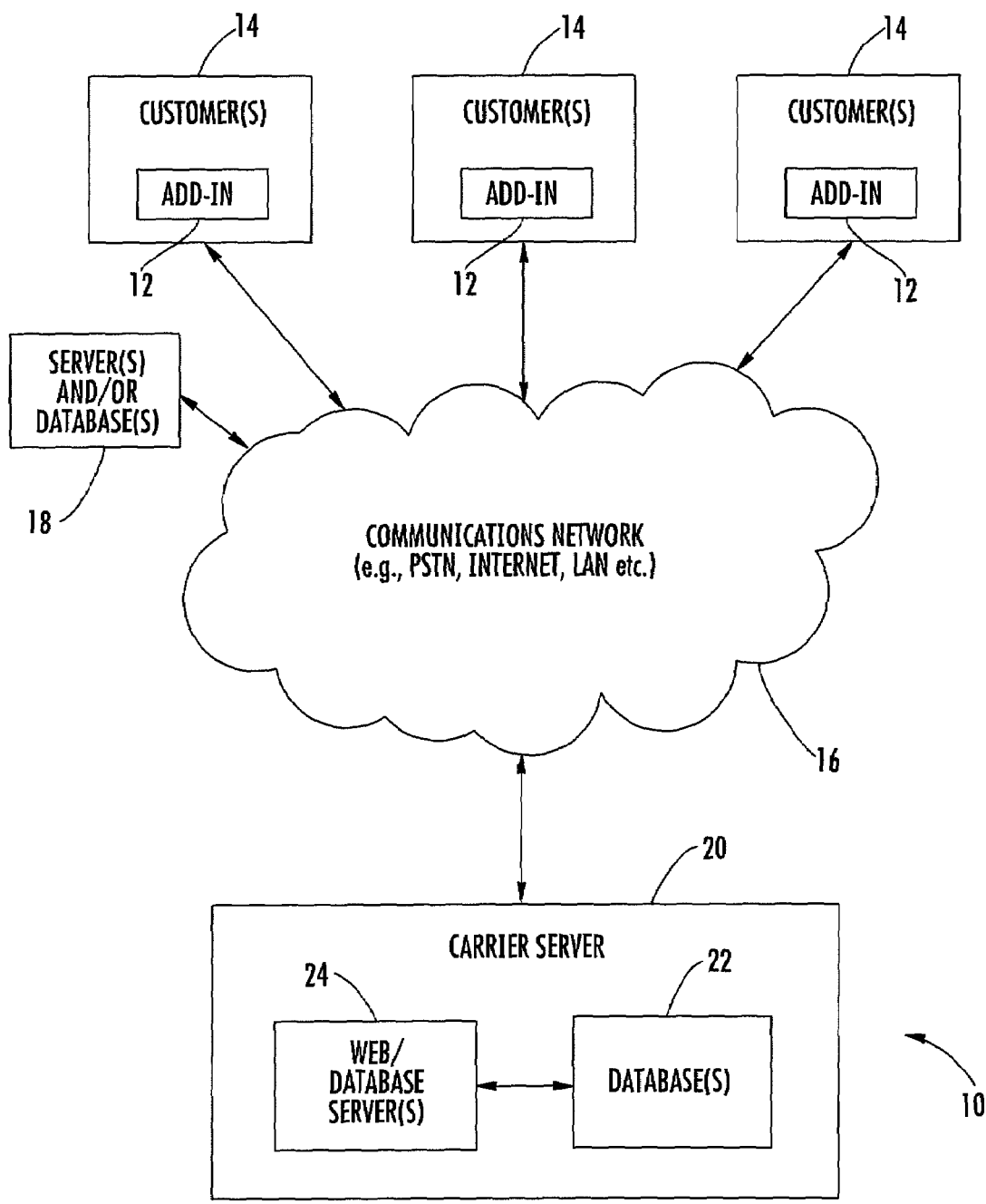
FIG. 1 is a block diagram illustrating the basic components of a computer system implementing an embodiment of the present invention.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code embodied in the storage medium. More particularly, the present invention may take the form of web-implemented computer software. Any suitable computer-readable storage medium that participates in providing instructions to a computer or processor for execution may be suitable. Such a medium may take many forms, including but not limited to, non-volatile media, volatile media, and transmission media. Non-volatile media include, for example, optical or magnetic disks. Volatile media include dynamic memory, such as a computer's main memory. Transmission media include coaxial cables, copper wire and fiber optics. Transmission media can also take the form of acoustic or light waves, such as those generated during radio frequency (RF) and infrared (IR) data communications. Examples of common forms of computer-readable media include a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

The present invention is described below with reference to block diagrams and flowchart illustrations of systems, methods, apparatuses and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present invention enables customers of parcel carriers to access shipping information pertaining to the shipment of parcels without having to perform numerous steps such as launching new applications on their desktop, inputting data, copying/pasting data, etc. The present invention enables a user to automatically access shipping information located on a remote server. The user merely selects an action associated with a text string either recognized by a MICROSOFT OFFICE® smart tag or highlighted by user. The actions from which to select include tracking, time in transit, shipping history, label generation, address validation, proof of delivery and rate and service selection. The present invention automatically cuts the necessary text, opens or accesses databases, files, applications, websites, etc., to obtain the desired shipping information and then processes the data retrieved (including cutting, pasting, inserting or manipulating data and initiating actions such as dialing a phone number, generating a label or sending an e-mail). Of particular note, the present invention can do this without leaving the application in which a user is working, such as MICROSOFT EXCEL®, WORD® or OUTLOOK®.

The present invention can utilize Microsoft smart tags to automatically recognize words, phrases, numbers and patterns in a MICROSOFT EXCEL®, WORD® or OUTLOOK® document. For example, a tracking number, postal code or a proper name having a particular pattern can be recognized. Smart tags work in a similar manner to that of the spell check feature in Microsoft Word by adding intelligence to applications to flag mistakes or automatically change them. With smart tags, however, an identified text string is flagged with some sort of visual indication (e.g., a notice information icon) because it is of interest or needs some kind of attention. The smart tag application utilizes recognizer to identify certain text strings having particular patterns, such as a tracking number, proper name, and postal code.

The user can then left-click on the visual indicator with their mouse to reveal one or more optional action to be conducted based on the recognized text string. In an alternative embodiment, the user highlights the text string of interest and then select a toolbar command or menu item custom designed for the present invention that provides for substantially the same action as the smart tags. This embodiment is particularly useful when the text string of interest is unique to that customer and the generally deployed add-in for smart tags would not include a recognizer for that text string.

Once the action has been selected, the present invention executes the action by copying the recognized or highlighted text string (and possibly other related data associated with the user or customer) and preparing the appropriate request for data in accordance with the selected action. This may include launching other applications such as a web browser or accessing databases or files located within a local network (e.g., LAN) or an external network (e.g., the internet). The retrieved shipping information is then processed for presentation to the user, such as by pasting the information in the document in which the text string was identified or by presenting the information in a message box.

With reference to FIG. 1, a system 10 implementing an embodiment of the present invention is illustrated. The illustrated embodiment of the present invention delivers its functionality to customers via an add-in software module (hereinafter "add-in") 12. The add-ins 12 are installed on a customer devices 14. The customer device 14 may comprise a desktop computer, PDA, telephone, or any other messaging or communication device with sufficient resources to support communications with other devices via a communications network 16. The communications network 16 in the preferred embodiment comprises the internet, though it will be appreciated by those skilled in the art that the communications network 16 may comprise a public switch telephone network (PSTN), local area network (LAN), cellular or satellite network, cable network, or any other suitable communications network, alone or in combination with one another and the Internet. Accordingly, the customer devices 14 are able to communicate with a customer server/database 18 and/or a carrier server 20 via the communications network 16.

The add-in 12 comprises software code which can be installed in connection with a client-based application operating on customer device 14, such as a plug-in, COM object, Active X Control, or DLL installed in connection with MICROSOFT OFFICE®. The add-in 12 may be provided and installed from a computer readable medium such as a diskette, CD, flash card (or the equivalent), or downloaded via the communications network 16 from a remote location, such as the carrier server 20. Depending on the functionality desired, the add-in 12 can be invoked as a smart tag function or as an enhanced toolbar/menu command or icon. Stated differently, the add-in 12 can utilize the functionality of smart tags as the interface for recognizing text strings automatically and/or may add one or more customized icons (i.e., commands) to the toolbar or items to the menu bar of the application(s) to which it is installed. In either case, the execution of the selected actions on the identified text is substantially the same regardless of whether the action is selected from a smart tag option list or by selecting a customized toolbar icon or menu item.

The customer server(s) and/or database(s) 18 may be associated with one or more customers 14 as part of a single company's network. In this regard, certain shipping information may be stored remote to the customer device 14 but within the company's network. For example, a company may have numerous customer devices 14 distributed throughout a geographic area, all with substantially equal access to shipping information for the company stored on a single or multiple servers and/or databases 18. An example of such configuration is the UPS WorldShip® software solution.

Alternatively, a customer device 14 may access a remote carrier server 20 to obtain shipping information stored on one or more databases 22, which are accessible via one or more web/database servers 24. In this context, the add-in 12 generates and sends a request to the carrier server 20 via communications network 16, such as by establishing an internet connection and sending an XML message. The request it is received and processed by the web/database server 24, which may include the retrieval of certain shipping information stored in the database(s) 22. The web/database server 24 then prepares and sends a response back to the add-in 12 at the customer device 14, such as in the form of a web page or XML message. An example of such a carrier server is the UPS Online Tools, which is based on XML messaging.

Figure 2:
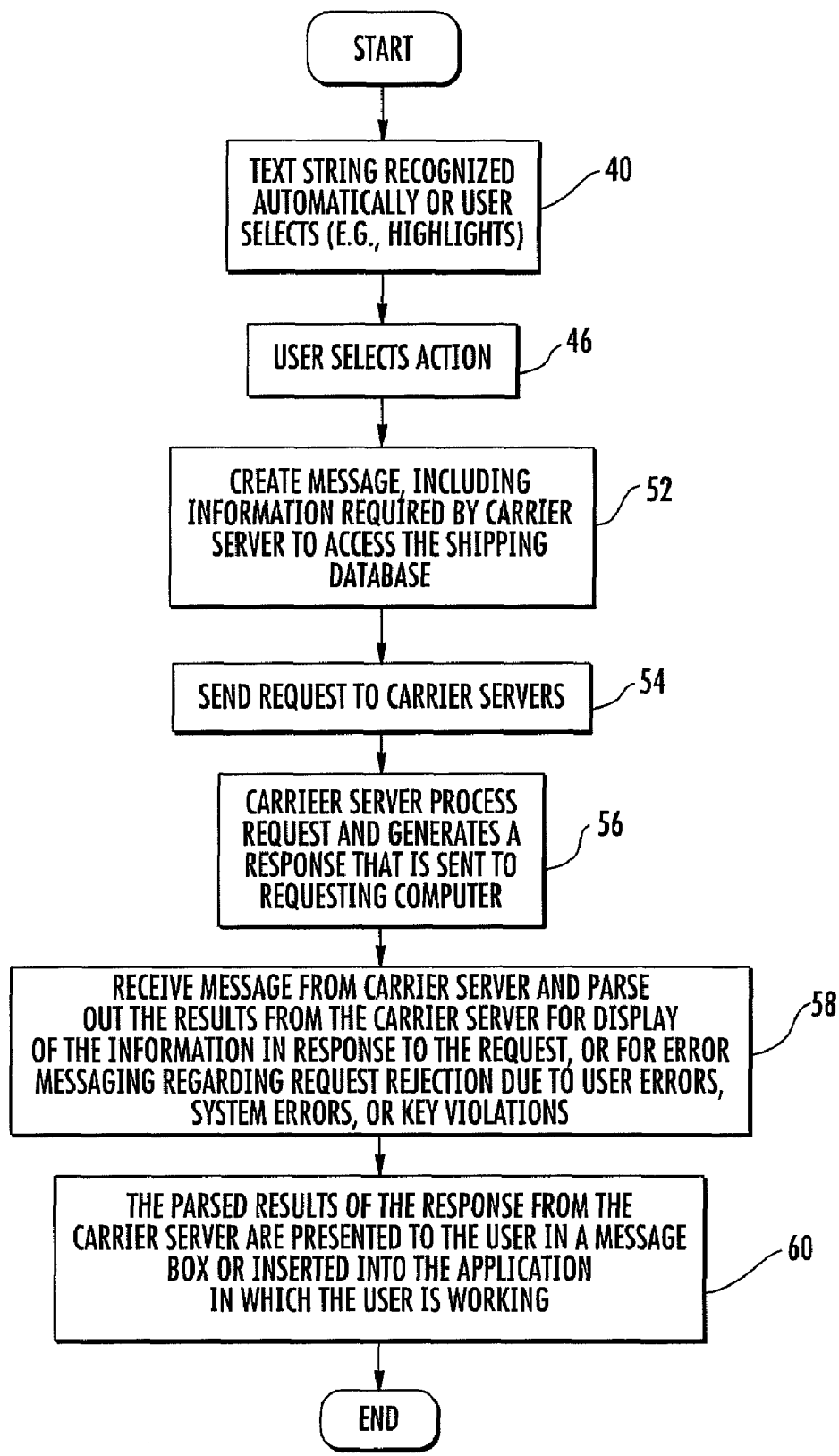
FIG. 2 is a flow chart illustrating a method in accordance with an embodiment of the present invention.

With reference to FIG. 2, a flowchart of the operation of a system for obtaining shipping information in accordance with an embodiment in the present invention is provided. It is assumed for purposes of the following discussion that an add-in 12 in accordance with the present invention has been installed on a customer device 14 so as to operate in accordance with the following methodology. In the embodiment described, an add-in 12 is installed into version of MICROSOFT OFFICE XP® for use with MICROSOFT OFFICE® applications such as MICROSOFT WORD®, MICROSOFT EXCEL® and MICROSOFT OUTLOOK®. It is well known in the industry that the installation can be performed by an executable file that installs the add-in, making the appropriate entries in the program registry and the necessary program code is loaded onto the customer device. Once installed, at block 40, a text string is either recognized automatically by the smart tag feature of Microsoft Office or the user selects a text string such as by highlighting the text string with the cursor. In the case of the former, the add-in 12 includes recognizers defined to identify text strings of interest, such as a tracking number, which have a certain pattern such as "1ZX . . . X." The recognized text string is identified by a distinctive visual marking, such as a notice information icon 42 as shown in FIG. 3. Alternatively, in the case of the latter, the text string is selected by the user, such as by highlighting the text string. This may be particularly advantageous with reference number tracking where a unique number (such as an account number) is given a parcel or group of parcels by the customer and the carrier tracks that number. Since the reference number may be different for each customer, it would be impractical if not impossible to build a smart tag recognizer suitable for all users. Therefore, in such circumstance, it is desirable to allow the user to select the text string, such as the text string 44 shown in FIG. 4.

Figure 4:
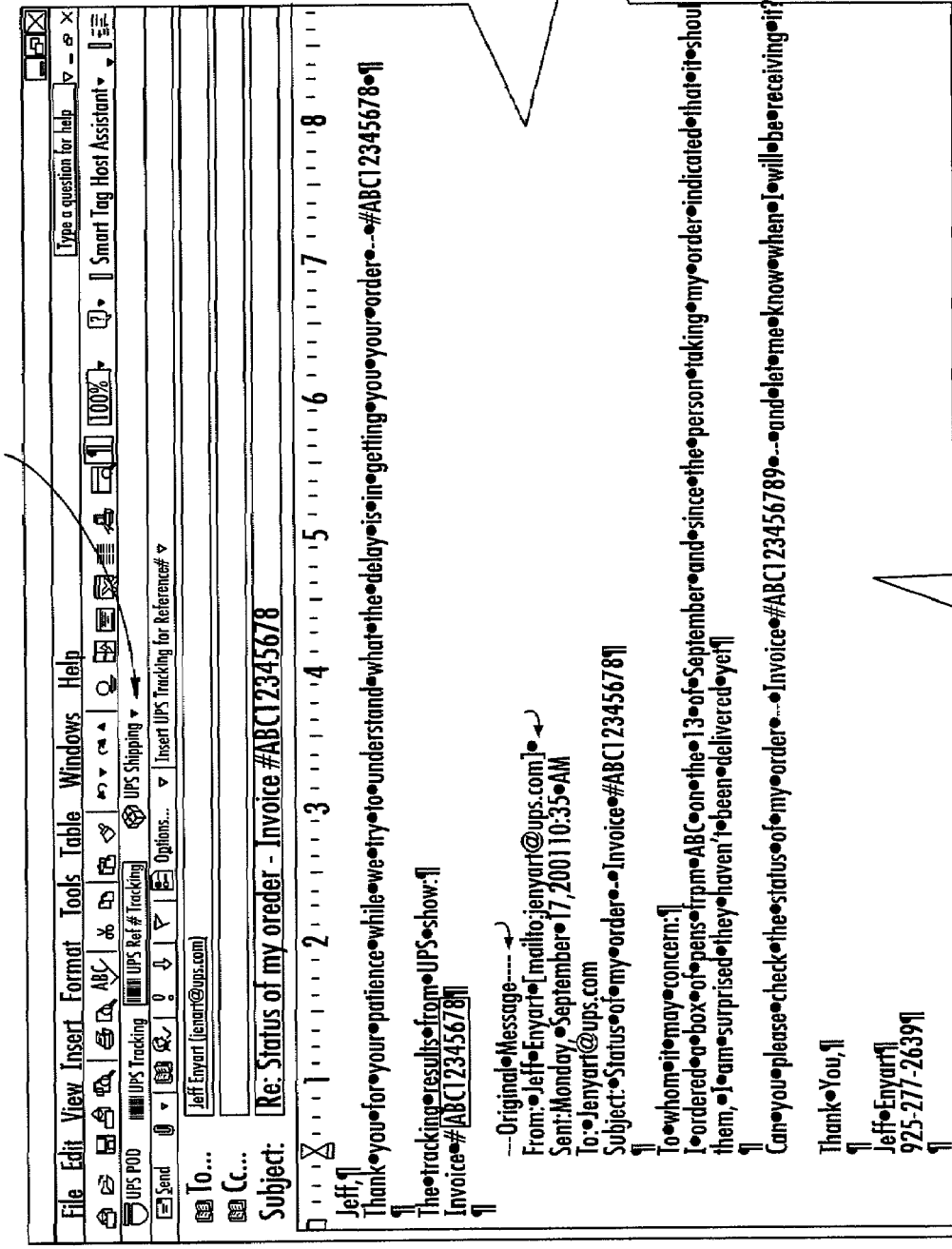

At block 46, the user is presented with selectable actions via the smart tag notice information icon drop down menu, such as the menu 48 shown in FIG. 5, or customized toolbar icons or menu bar items such as toolbar icons 50 shown in FIG. 4. The tool bar icons and/or menu bar items are generated by the add-in 12 upon installation, and may be selected by the user for invoking a certain action on the selected (e.g., highlighted) text. The user then selects a desired action from those available. In the case of the smart tag implementation, the actions presented to the user are preferably based upon the text string recognized. For example, if the text string recognized is a shipping number, the selectable actions presented to the user are limited to those appropriate for a shipping number. Examples of some of the selectable actions include tracking, time and transmit, shipping history, label generation, proof of delivery, address validation, signature tracking, and rate and service selection.

Once the user selects an action, the add-in executes the action. For purposes of the present discussion, the user requests an action that requires the add-in to access information that is remotely located, such as the MyUPS.com server and database. However, in accordance with the present invention, the action selected by the user may require access to data maintained within a company's network, such as data stored at a UPS WorldShip database. The present invention can also be extended to include access to contact list or other data maintained local to the customer device. Thus, at block 52, the add-in creates an appropriate request for executing the desired action. In the case of the embodiment discussed herein, this includes the creation of a message that includes information required by the carrier server to access the shipping information located at carrier server 22. For example, the request may include security and identity information necessary to access the data as well as the identified text string or a portion thereof.

At block 54, the request is sent to the carrier servers utilizing appropriate security and data compression protocols. At the carrier server 20 the request is processed and a response is generated and sent to the customer device. See block 56. The carrier server 20 functions such as authentication, reporting, tracking, and message rejection are performed as appropriate. At block 58, the message from the carrier server is received by the customer device and the results are parsed out for display of the shipping information to the user. This also includes, where appropriate, error messaging due cause by the user, system or otherwise.

Figure 6:
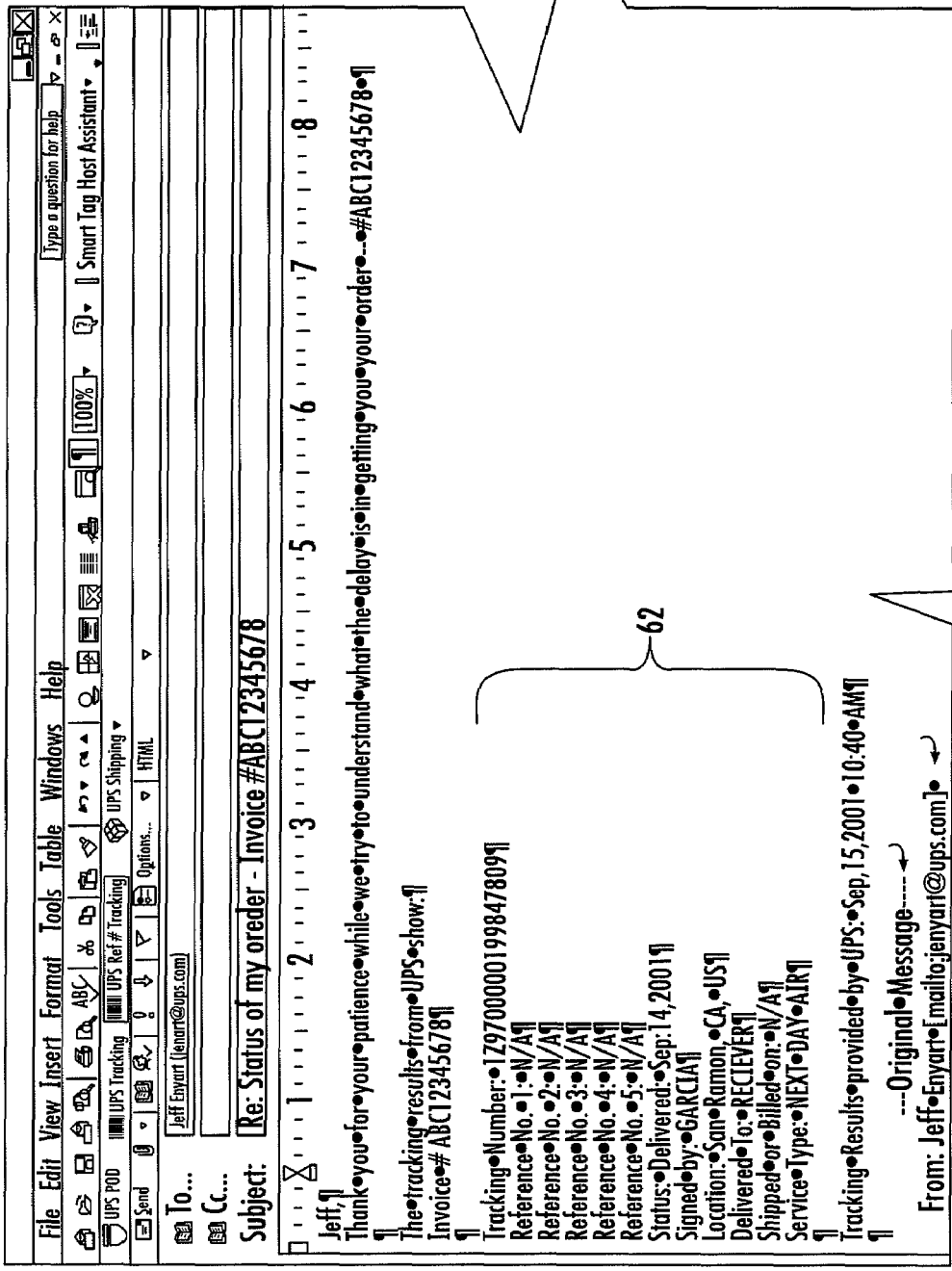

Lastly, at block 60, the parsed results from the carrier server 20 are presented to the user in one or more of a variety of ways. For example, the results may be inserted into the document or spreadsheet in which the text string was identified, as illustrated by insert 62 shown in FIG. 6. Alternatively, the results may be presented as a message box, as illustrated by message box 64 of FIG. 7. In addition, the results may be stored locally on the customer device or the customer server/database 18, as desired.

If the user is working in a MICROSOFT WORD® document, the results may be pasted at the end of the document or immediately after the text block in which the text string was identified. If the text string was identified in a table, then the results may be pasted in the same table cell as the identified text string. If the user is working in an MICROSOFT EXCEL® spreadsheet, then the results may be fanned in a single row from left to right or fanned down from top to bottom, in respective cells in either case. In addition, formatting may be added, such as column or row headings. If the user is working in MICROSOFT OUTLOOK®, then the results may be pasted at the end of the document or immediately after the text block in which the text string was identified.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for obtaining shipping information, comprising:
providing a software add-in module configured for installation in connection with a software application, wherein the add-in module is stored on a computer readable medium operable comprising code that upon the user invoking one of one or more predefined actions causes the user computer to execute steps comprising:
recognizing one or more predefined text strings or user-selected text strings in a document or file being operated on by the software application and for which the one or more predefined actions can be invoked, wherein the one or more predefined or user-selected text strings are located in an electronic file or document containing a plurality of text strings, wherein at least some of the text strings in the file or document are unrelated to shipping information for a parcel; and in response to the user invoking one of the one or more predefined actions,
analyzing text in the file or document;
identifying from the text in the file or document the one or more predefined or user-selected text strings that relate to shipping information;
generating a request for shipping information associated with the one or more identified text strings to be sent to a remote server including a database having shipping information associated with parcels in accordance with the invoked action;
transmitting the request to the remote server;
receiving from the remote server the shipping information associated with the parcels and based on the one or more identified text strings;
parsing the shipping information associated with the parcels and based on the one or more identified text strings received based on the invoked action; and
sending the parsed shipping information associated with the parcels and based on the one or more identified text strings to the software application in response to the request.

2. The method of claim 1, wherein the transmitting of the request includes transmitting user identification information.

3. The method of claim 1, wherein the receipt of the requested shipping information includes receiving at least one of time in transit information, tracking information, address validation information, rate information or shipping label generation information. one of time in transit data, tracking data, address validation data, rate data or shipping label generation data.

4. A system for obtaining shipping information associated with a parcel, comprising:
a customer device comprised of a computer;
a server including a database having shipping information associated with parcels, wherein the information is accessible by users and the server is remote to the customer device;
a communication network connecting the customer device and the remote server; and
a software application operable on the customer device, wherein the software application recognizes one or more predefined text strings or user-selected text strings for which one or more predefined actions can be invoked, including accessing at least certain of the shipping information at the server associated with the parcels and based on the one or more recognized text string, wherein the one or more predefined or user-selected text strings are located in an electronic file or document containing a plurality of text strings, wherein at least some of the text strings in the file or document are unrelated to shipping information for a parcel, and said software application in response to the user invoking one of the one or more predefined actions:

analyzes text in the file or document;

identifies from the text in the file or document the one or more predefined or user-selected text strings that relate to shipping information;

generates a request for shipping information associated with the parcels and based on the one or more identified text strings to be sent to the remote server in accordance with the invoked action such that the shipping information associated with the parcels and based on the one or more identified text strings can be retrieved from the remote server;

transmits the request to the remote server;

receives from the remote server the shipping information associated with the parcels and based on the one or more identified text strings;

parses the shipping information associated with the parcels and based on the one or more identified text strings received based on the invoked action; and sends the parsed shipping information associated with the parcels and based on the one or more identified text strings to the customer device in response to the request.

5. The system of claim 4, wherein the shipping information includes tracking information.

6. The system of claim 4, wherein the shipping information includes time in transit information.

7. The system of claim 4, wherein the shipping information includes address validation information.

8. The system of claim 4, wherein the shipping information includes shipping label generation data.

9. The system of claim 4, wherein the shipping information includes rate information.

10. The system of claim 4, wherein the parsed shipping information is pasted into a document opened on a desktop of the computer or displayed in a message window on a desktop of the computer.

11. The system of claim 4, wherein the one or more predefined or user-selected text strings are located in a second software application, wherein said software application accesses the second software application, identifies the one or more predefined or user-selected text strings as relating to shipping information, and accesses said server to retrieve shipping information associated with the one or more predefined or user-selected text strings.

12. A computer program product for use integral with a software application executed by data processing system for obtaining shipping information from a remote source, said computer program product comprising:

a computer usable medium having computer-readable code means enabled stored in said medium that cause the computer to execute commands comprising:

recognizing one or more predefined text strings or user-selected text strings in a document or file being operated on by the software application and for which one or more predefined actions can be invoked, wherein the one or more predefined or user-selected text string are located in an electronic file or document containing a plurality of text strings, wherein at least some of the text strings in the file or document are unrelated to shipping information for a parcel; and in response to the user invoking one of the one or more predefined actions, analyzing text in the file or document;

identifying from the text in the file or document the one or more predefined or user-selected text strings that relate to shipping information;

generating a request for shipping information associated with the one or more identified text strings to be sent to a remote server including a database having shipping information associated with parcels in accordance with the invoked action;

transmitting the request to the remote server;

receiving from the remote server the shipping information associated with the parcels and based on the one or more identified text strings;

parsing the shipping information associated with the parcels and based on the one or more identified text strings received based on the invoked action; and sending the parsed shipping information associated with the parcels and based on the one or more identified text strings to the software application in response to the request.

13. The computer program product of claim 12, wherein the shipping information includes time in transit information.

14. The computer program product of claim 12, wherein the shipping information includes address validation information.

15. The computer program product of claim 12, wherein the shipping information includes shipping label generation.

16. The computer program product of claim 12, wherein the shipping information includes rate information.

17. The computer program product of claim 12, further comprising computer readable program code means that causes the computer to present the parsed shipping information associated with the parcels and based on the one or more identified text strings to a user.

18. The computer program product of claim 12, further comprising computer readable program code means that causes the computer to paste the parsed shipping information associated with the parcels and based on the one or more identified text strings in a document or file being operated on by the software application.

19. The computer program product of claim 12, wherein the computer readable program code means that causes the computer to generates a request causes the computer to generate a request including user identification information.

* * * * *

UNITED STATES PATENT AND TRADEMARK OFFICE
CERTIFICATE OF CORRECTION

PATENT NO. : 7,349,854 B2  
APPLICATION NO. : 10/142749  
DATED : March 25, 2008  
INVENTOR(S) : Frederick It is certified that error appears in the above-identified patent and that said Letters Patent is hereby corrected as shown below:

<u>Column 8,</u>

Lines 47-49, cancel "one of time in transit data, tracking data, address validation data, rate data or shipping label generation data";

Line 55, "to" should read --from--;

Line 66, "string" should read --strings--.

<u>Column 9,</u>

Line 57, cancel "enabled".

<u>Column 10,</u>

Line 5, "string" should read --strings--;

Lines 55 and 56, cancel "causes the computer to generate a request".

Signed and Sealed this

Fifteenth Day of July, 2008

JON W. DUDAS  
*Director of the United States Patent and Trademark Office*